United States Patent [19]

Pole et al.

[11] 4,113,343

[45] Sep. 12, 1978

[54] HOLOGRAPHIC OPAQUE DOCUMENT SCANNER

[75] Inventors: Robert Vladimir Pole; Harald Willy Werlich, both of Los Gatos, Calif.

[73] Assignee: International Business Machines Corporation, Armonk, N.Y.

[21] Appl. No.: 798,042

[22] Filed: May 18, 1977

[51] Int. Cl.² .......................... G02B 27/17; G02B 5/32
[52] U.S. Cl. .................................... 350/3.71; 350/6.1
[58] Field of Search ..................... 350/3.71, 3.70, 3.72, 350/3.65, 6.1, 6.2, 6.5, 162 ZP, 162 R, 285

[56] References Cited

U.S. PATENT DOCUMENTS

| | | | |
|---|---|---|---|
| 3,922,059 | 11/1975 | Noguchi | 350/3.71 |
| 3,940,202 | 2/1976 | Kato et al. | 350/3.71 |
| 3,951,509 | 4/1976 | Noguchi et al. | 350/3.71 |
| 3,972,582 | 8/1976 | Oosaka et al. | 350/3.71 |

OTHER PUBLICATIONS

Pole et al., *Applied Optics*, vol. 14, No. 4, Apr. 1975, pp. 976-980.
Wyant, *Applied Optics*, vol. 14, No. 5, May 1975, pp. 1057-1058.

*Primary Examiner*—Ronald J. Stern
*Attorney, Agent, or Firm*—Richard E. Cummins

[57] ABSTRACT

An opaque document scanner in which a moving hologram generates a locus of points from a stationary light beam on an opaque document and the same hologram or a similar one mounted for conjoint movement collects light energy reflected from the document at each point and focuses this energy onto a stationary detector to provide electrical signals corresponding to the information scanned on the document.

16 Claims, 15 Drawing Figures

HOLOGRAPHIC OPAQUE DOCUMENT SCANNER

CROSS-REFERENCES TO RELATED APPLICATIONS

This application is related to co-pending application Ser. No. 643,891 filed Dec. 23, 1975, now abandoned.

BACKGROUND OF THE INVENTION

1. Field of the Invention

This invention relates to apparatus for scanning opaque documents to provide an electrical signal which corresponds to the information on the documents.

2. Description of Prior Art

Various arrangements are known in the art for converting information contained on a surface to a corresponding electrical signal. Such arrangements generally involve two basic functions, that is, deflecting a light beam across the information and detecting the amount of light which is either transmitted through the surface if the surface is transparent, or detecting the amount of light reflected back from the surface if the surface is opaque. In those arrangements where the detector is sensing the amount of light transmitted through the document, the optical path from the light source to the detector is generally less complex than where the detector is sensing reflected light. In the latter situation, both the detector and the light source must be positioned on the same side of the surface — and since these are physical components, the path from the light source to the document must necessarily be different than the path for the reflected light from the document to the detector. The amount of light energy reflected from a surface is of course dependent upon the amount of light from the source and the reflective characteristics of the surface. If the surface to be scanned is an ordinary document, the percentage of energy reflected is relatively low. The cost of the light source is generally directly proportional to the energy that it can deliver while the cost of a light-responsive detector is also generally proportional to its sensitivity. The power of the light source, the reflectivity of the surface and the sensitivity of the detector must all be considered in the design of any practical opaque document scanner. In addition, for a given surface reflectance, cost tradeoffs exist between the type of light source and the type of detector.

Laser light sources have been recognized as efficient, economical, high-energy light sources for document scanning applications. However, until recently, the arrangements proposed for achieving the scanning function have been relatively cumbersome and costly. This situation was caused by the need to provide in the light path complicated lens systems and moving components such as multi-faceted rotating mirrors which would cause the beam to move in some predetermined scan direction across the document. The number of scan lines per inch, i.e., resolution, required to convert the information on the surface into electrical signals determined the allowable tolerance for the moving components which, in turn, directly affected the cost. In addition, where the optical path for the beam deflector involved many mechanical components and the information on the document was sensed by the amount of light reflected, the path for the reflected light from the document generally also required an optical component whose movement had to be maintained in synchronism with the moving component of the scanning system. The manner in which the synchronization was achieved also affected the cost of such system.

The use of holograms in document scanning systems has been demonstrated in the prior art. It has been shown, for example, in U.S. Pat. No. 3,795,768, that a reflection hologram which is rotated can produce a scanning circle composed of a locus of points of radiation when the hologram is illuminated with a beam of light from a laser source. In such a system the document to be scanned is positioned on a segment of the locus and a single line scan is achieved. In this system, the document is moved parallel to the axis of rotation of the hologram so that the entire document may be scanned.

Another type of arrangement is discussed in *Applied Optics* 1967, Vol. 6, No. 9 pages 1531-1534. In this system a transmissive hologram is rotated between the laser light beam and the document and the image spot follows a circular path in the plane of the document. Such a system is generally not suitable where a linear scan line is required, In our co-pending application referred to above, there is disclosed a holographic deflector for a laser light beam in which scan lines are provided across a document. The structure of the hologram in that application provides a scanning line which is not parallel to the direction of movement of the hologram. A more conventional line scan, for example, one which would scan across the width of a printed page, can be generated by the device disclosed in an article entitled "Holographic Laser Beam Deflector" by Pole and Wollenmann published on Apr. 4, 1975, in *Applied Optics* Vol. 14, No. 4, beginning on page 976. The present invention employs some structure similar to that disclosed in the above-mentioned paper.

SUMMARY

The present invention provides an opaque document scanning apparatus employing a moving hologram which functions both to scan a focused laser light beam across an incremental area of a document and to collect the diffusely reflected light from the incremental area and image it on a stationary light responsive detector to generate a signal which corresponds to the information on the scanned portion of the document. In the preferred embodiment of the invention, the same moving hologram is employed to provide both functions. In the second embodiment, a separate hologram is employed for each function, but the two holograms are fixed relative to each other so that their movement relative to the light beam and the detector is automatically synchronized.

One object of the present invention is therefore to provide an improved opaque document scanner.

A further object of the present invention is to provide an opaque document scanner in which a single hologram is employed for generating a line scan consisting of a locus of points and simultaneously is employed for collecting the diffusely reflected energy from the document and focusing it on the light responsive detector.

Another object of the present invention is to simplify the synchronization of the optical components in an opaque document scanner.

The invention will be better understood in connection with the following description when read in connection with the drawings in which.

DESCRIPTION OF THE PREFERRED EMBODIMENT OF THE INVENTION

Figure 1A:
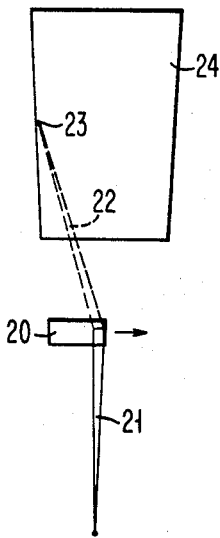
FIGS. 1A through 1C illustrate diagrammatically how in a prior art arrangement a moving hologram can generate a line scan from a stationary laser light beam.
Figure 1B:
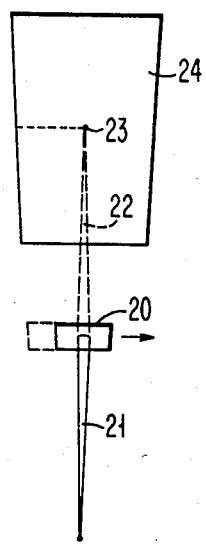
Figure 1C:
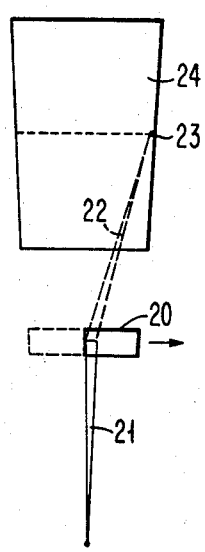

Prior to describing the preferred embodiment shown in FIGS. 4A, 4B, the principles of operation will first be discussed in connection with FIGS. 1-3. FIGS. 1A-1C illustrate the basic principles of operation of the holographic laser beam deflector which is described in detail in the Pole et al article referred to earlier. In FIG. 1 the hologram 20 is assumed to have been previously formed by two coherent beams A and B, as shown in FIG. 1 of that article. The laser beam designated 21 represents a fraction $\Delta\phi_A$ of the original reference beam $\phi_A$. Likewise, the reconstructed beam 22 represents a fraction $\Delta\phi_B$ of the original beam $\phi_B$. As illustrated in FIGS. 1A-1C, and explained in Section 2 of the Pole et al article, movement of the hologram 20 relative to the beam 21 provides a scanning cone of light arising from successive reconstructions of different portions of the original beam $\phi_B$. The focal point of each successively reconstructed cone $\phi B$ represents an illuminated point 23 on document 24 and together they achieve a scanning line.

Figure 2A:
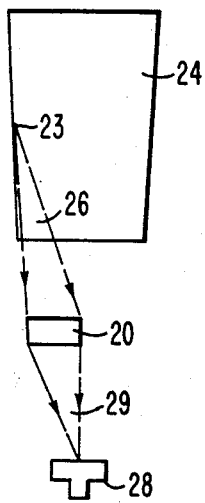
FIGS. 2A through 2C illustrate diagrammatically how a moving hologram can be employed to capture scattered light reflected from a spot when scanning an opaque document and focus it on a stationary light detector.
Figure 2B:
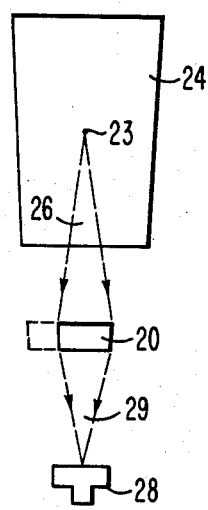
Figure 2C:
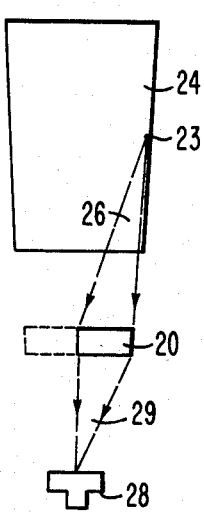

FIG. 2 illustrates how the same hologram 20 can be used to collect scattered light reflected from document 24. It is assumed for purposes of explanation that the pattern of reflected light contains a cone of light 26 which corresponds generally to the original cone of light employed in constructing the hologram 20. This is shown in detail in FIG. 8. Hologram 20 will therefore reconstruct the original $\phi A$ reference beam 29 or a portion of it. By locating a light responsive detector 28 at a point corresponding to the origin on the original reference beam $\phi A$, the output of the detector 28 will produce a signal whose amplitude, for example, represents the amount of reflected energy at a given point 23 on the surface of document 24.

Figure 3A:
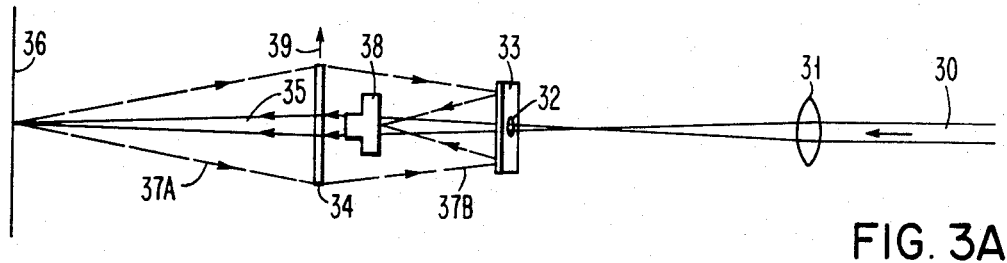
FIGS. 3A and 3B illustrate diagrammatically how a single hologram functions to cause a line scan of a document from a stationary laser light beam and simultaneously focus the diffusely reflected radiation from the document onto a stationary detector.
Figure 3B:
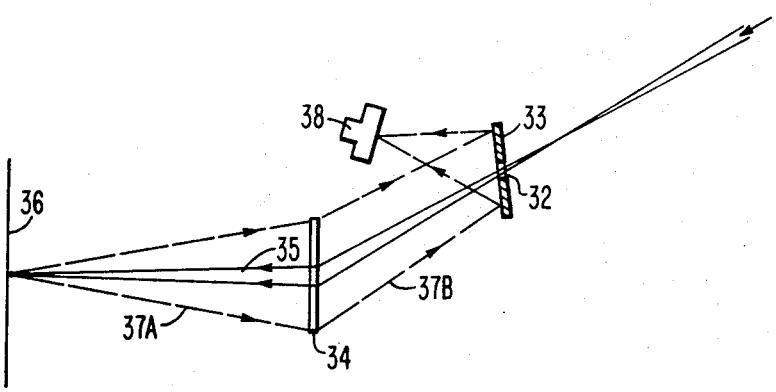

FIGS. 3A and 3B illustrate diagrammatically the basic arrangement of the preferred embodiment of the opaque document scanner shown in FIG. 4. As shown in FIG. 3, a cylindrical beam 30 of coherent light from a laser, for example, is directed through a focusing lens 31 then through an aperture 32 in a mirror 33 through a portion of the hologram 34 which reconstructs a scanning cone of light 35 onto a document 36. Document 36 is positioned at a distance corresponding to the origin of the object beam of light by which hologram 34 was constructed. Reflected energy from the document 36 represented by beam 37A is imaged by the entire hologram 34 and in effect reconstructs the reference beam initially used in making the original hologram. As shown in FIG. 3B, the reconstructed beam 37B is focused onto mirror 33 which reflects the beam to the stationary detector 38. Movement of the hologram in the direction of arrow 39 causes the cone 35 to move upwardly from the position in which it is shown in FIG. 3A creating a scanning line on document 36. The pattern of diffusely reflected light for any given point at any given time on the document relative to the hologram 34 remains constant, and the point is imaged on the detector 38 regardless of this movement.

It will be seen that by using the same hologram for providing both functions in an opaque document scanner that the problems of synchronizing the moving elements have been greatly simplified.

Figure 4A:
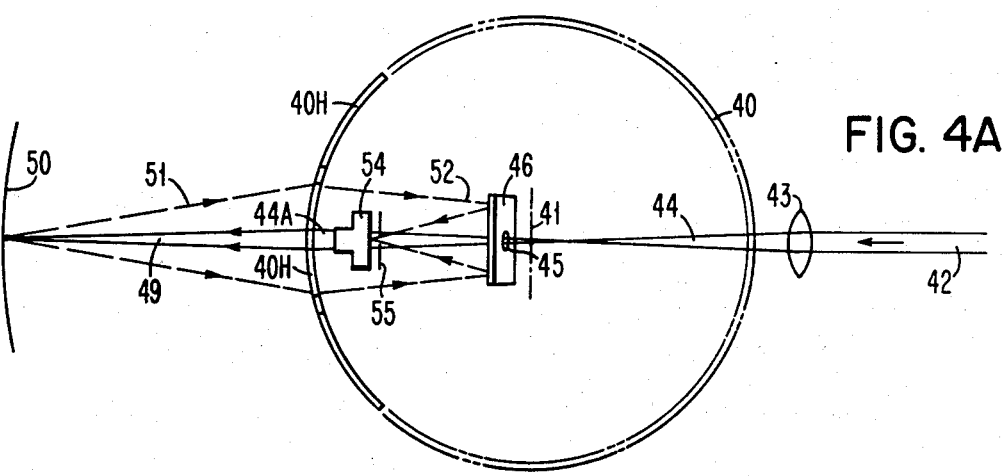
FIGS. 4A and 4B illustrate an opaque document scanner employing the arrangement shown in FIG. 3 in which the hologram is positioned on a rotatable cylinder.
Figure 4B:
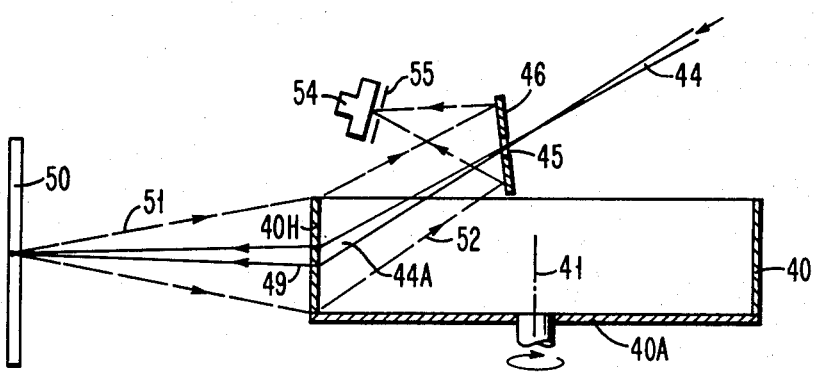

The preferred embodiment of the invention as shown in FIGS. 4A and 4B comprises a transparent cylindrical member 40 on which a number of volume phase holograms 40H have been constructed. As discussed in the Pole et al article, the number of holograms to be employed is dependent on the particular application, but for purposes of explanation, it is assumed that the number of individual holograms is 18. The aperture angle $\phi A$ of the reference beam used to create the hologram is given by $\phi A = 360/n = 20°$. The aperture angle $\phi B$ of the object beam is determined by both the required deflection and the distance from the document to the hologram. In the preferred embodiment, the aperture angle $\phi B$ of the object beam is assumed to be $\sim 2°$. If the diameter of the cylindrical member is approximately 6 inches, each individual hologram 40H would have a length of approximately 1 inch on the circumference of cylindrical member 40.

Cylindrical member 40 is mounted for rotation by a constant speed motor about an axis 41 by any suitable means. As shown, a base member 40A is provided for attaching member 40 to the motor shaft.

The means for illuminating the holograms 40H with a fraction $\Delta\phi A$ of the original reference beam $\phi A$ used to create the holgrams, as shown in the preferred embodiment comprises a suitable beam 42 from a source of coherent radiation. The direction of the beam 42 is such that it intersects the axis of rotation 41 of the cylindrical member 40. A focusing lens 43 is provided to focus the collimated beam 42 into a cone shaped beam 44 having a focal point which is on the axis of rotation 41. Beam 44 passes through an aperture 45 in a mirror 46 resulting in beam 44 impinging on the hologram 40H. Cone shaped beam 44A corresponds to a fraction $\Delta\phi A$ of the original reference beam $\phi A$. Focusing lens 43 may be mounted in any suitable manner to achieve its intended function.

As previously explained in connection with FIGS. 1-3, the hologram 40H reconstructs a fraction of the original object beam $\phi B$ used to create the initial hologram. In FIG. 4, $\Delta\phi B$ is indicated by reference character 49. The focal point of the reconstructed beam corresponds to the point of origin of the initial object beam $\phi B$. Document 50 is generally curved so that its surface is normal to the beam 49. The distance from the plane of the document 50 to the hologram 40H in the example shown is approximately 26 inches, resulting in a scan line across the document of approximately 8.5 inches as the 6-inch cylindrical member 40 is rotated through one complete hologram 40H.

Figure 8:
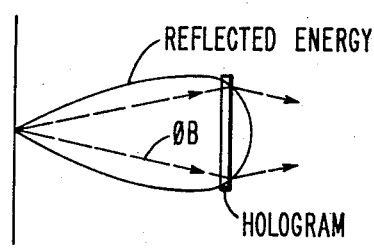
FIG. 8 illustrates the pattern of scattered or diffused light reflected from a single point on an opaque document when illuminated by the light deflector shown in FIG. 1.

A pattern of reflected light from a point on a typical document is shown in FIG. 8. The pattern varies depending upon the surface characteristics of the document, but for most documents a pattern of diffused or scattered light similar to that shown in FIG. 8 is typical. For purposes of explanation, it can be assumed that the pattern of FIG. 8 corresponds to a large degree to the object beam $\phi B$ used initially in constructing the hologram so that substantially the complete hologram 40H is subjected to the back-scattered light. As shown in FIG. 4, the entire hologram 40H is illuminated by diverging beam 51 which represents a percentage of the back-scattered light determined by the geometry of the various components. Hologram 40H therefore reconstructs the original reference beam $\phi A$ represented by reference character 52 in FIG. 4. Beam 52 is deflected to the detector 54 by mirror 46 which is placed in the path of the reconstructed beam 52. Since the point on the document which is being illuminated by the beam 49 is actually being imaged onto the detector 54 by the hologram 40H, a stop plate 55 with a small aperture can be provided in front of the detector 54 to control the size of the beam impinging on the detector and improve the overall resolution of the system. If the pattern of reflected energy contains a strong specular component which would not vary to any large degree from one point to another along a scan line having different reflective characteristics, this specular component which is parallel to the axis of the illuminating beam is not reflected to detector 54. The reason for this is that the specular component passes through aperture 45 in mirror 46 and never reaches the detector. Where two holograms are employed, as in subsequent embodiments, the circumferential slot performs the function of eliminating this specular component from the detector.

It will be seen that the operation of the scanner shown in FIG. 4 is relatively simple and straightforward. Merely by energizing the motor, the cylindrical member 40 is brought up to speed, for example 10,000 RPM, and the coherent light beam 42 from the laser (not shown) is focused through lens 43 providing converging beam 44 up to the axis 41 and diverging beam 44A thereafter which illuminates a small incremental area of the hologram 40H. As previously explained, a succession of reconstructed beams 49 is created as the hologram 40H is moved relative to beam 44A resulting in a single scanning line of approximately 8.5 inches on document 50. Successive lines on the document can be scanned by moving the document upward as shown in FIG. 4B in which case the remaining holograms 40H positioned around the cylindrical member 40 could be constructed so that the scan line is displaced a finite amount in the vertical direction as shown in FIG. 4B, in which case a succession of different scan lines would be generated. The number of different scan lines would correspond to the number of holograms 40H on the cylindrical member 40.

Since the entire hologram 40H is subjected to the pattern of light reflected from the illuminated point on the document 50 during movement, the hologram 40H images the reflected pattern for each illuminated point to the detector 54 as the hologram is rotated. The output of the detector 54 therefore provides an electrical signal whose amplitude is a function of the reflective dependent characteristics of the surface of the document.

Figure 5A:
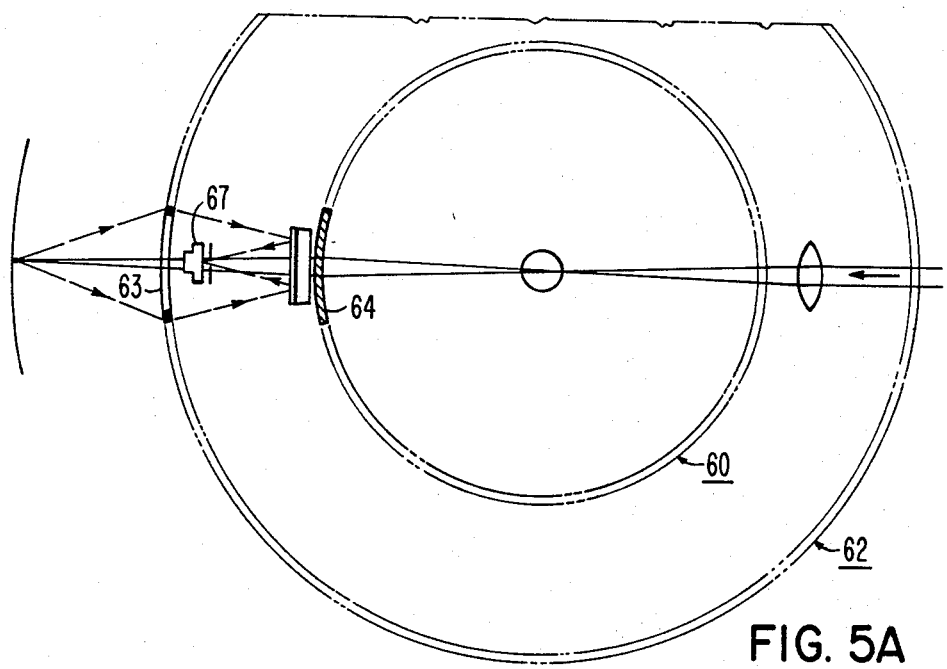
FIGS. 5A and 5B illustrate a modification of the embodiment of the invention shown in FIGS. 4A and 4B in which two separate but similar holograms are employed.
Figure 5B:
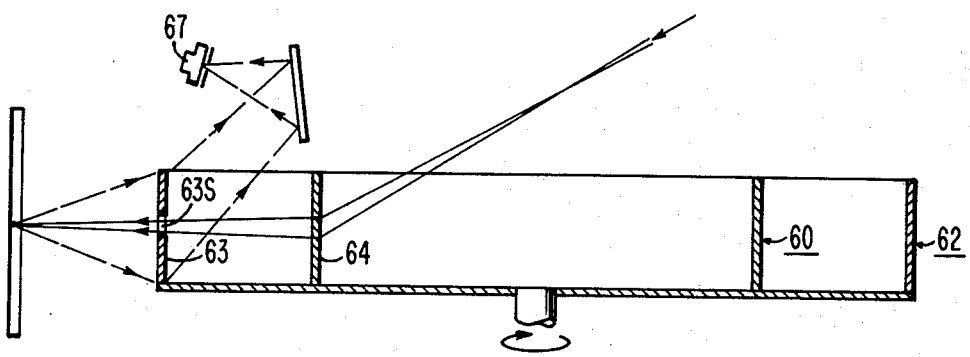

The embodiment of the invention shown in FIG. 5 is similar to that just described, except that two cylindrical members 60 and 62 are provided. The inner cylindrical member 60 corresponds to member 40 in FIG. 4. The outer cylindrical member 62 contains holograms 63 which are constructed similar to the holograms 64 on the inner member. Since the amount of energy reflected from the document is distance sensitive, in some scanning applications it may be advantageous to separate the two functions performed by the hologram 40H in FIG. 4.

In FIG. 5 hologram 64 provides the function of reconstructing the beam $\Delta\phi B$ of the original object beam $\phi B$. Hologram 63 on the other hand, functions to reconstruct the reference beam $\phi A$ which is then imaged onto the detector 67. Hologram 63 is provided with a circumferential slot 63S extending substantially its entire length so as not to interfere with the function of the hologram 64 in creating the scanning beam.

Figure 6:
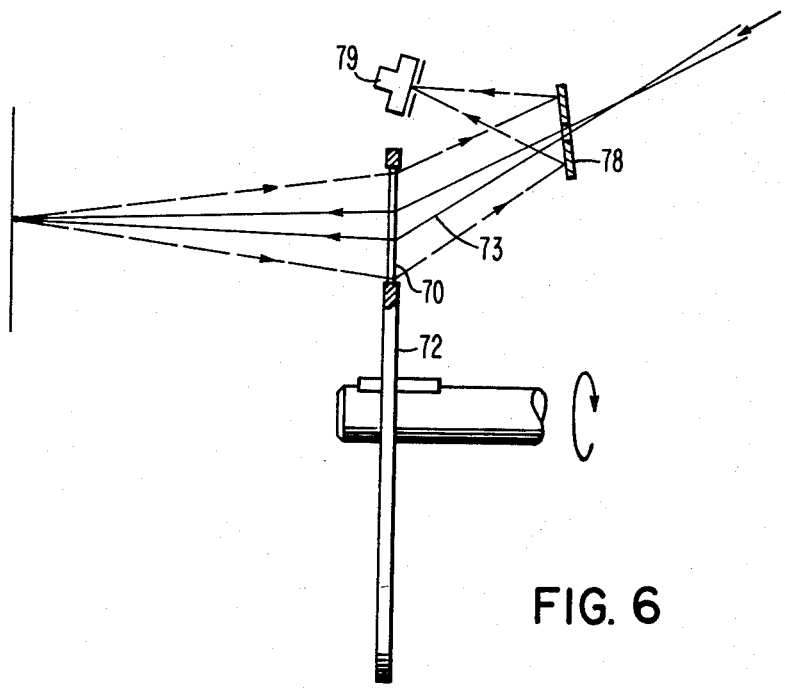
FIG. 6 illustrates another embodiment of the invention in which the hologram is mounted in a flat plate rotated about an axis which is generally normal to the plane of the paper.

The embodiment of the invention shown in FIG. 6 is similar in operation to the preferred embodiment in that a single hologram 70 is employed to perform both functions. As shown in FIG. 6, a flat disk 72 is employed as the carrier for the hologram 70. The rotation of the disk 72 and hologram 70 relative to the diverging beam 73 functions in the same manner as previously explained in connection with the preferred embodiment of FIG. 4, except that the scan line generated by movement of the hologram 70 creates a slightly arcuate line.

The hologram 70 also provides the function of imaging the point on the document which is being illuminated at that instant of time onto the mirror 78 and detector 79.

Figure 7:
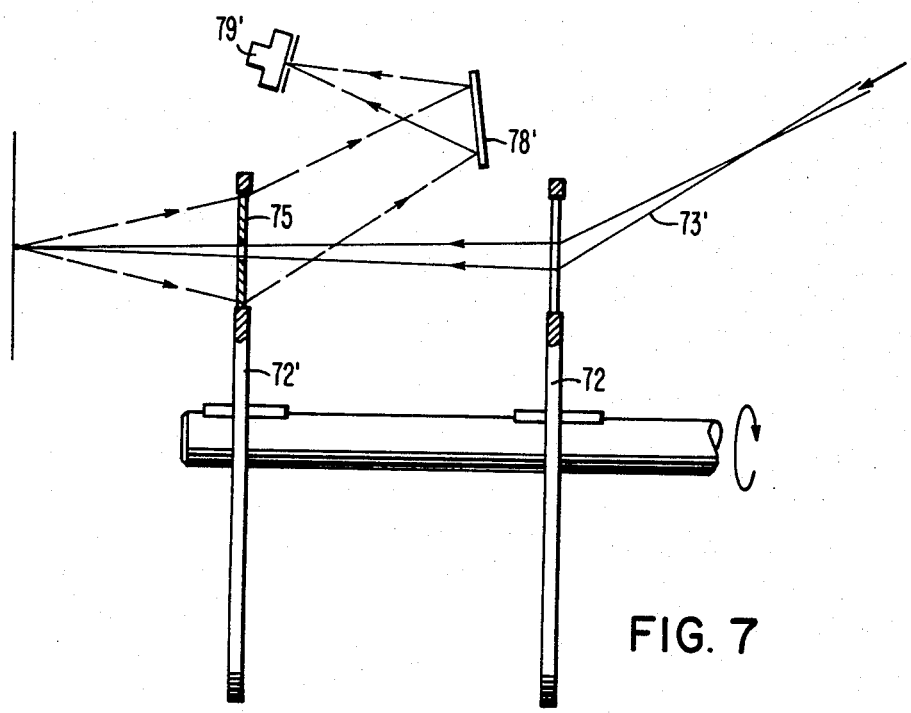
FIG. 7 illustrates a modification of the embodiment shown in FIG. 6 in which two separate flat plates are employed, each of which is used to move separate but identical holograms.

The embodiment of the invention shown in FIG. 7 is similar to FIG. 6 except that one hologram is provided for each function as was done in the apparatus of FIG. 5. Such an arrangement, as mentioned previously, may be advantageous in those applications where, because of the relatively small amount of energy reflected from the surface, it becomes necessary to place the hologram 75 relatively close to the document. When this occurs, it may not be practical to create a single hologram which would provide the necessary length of scan line when positioned close to the document surface.

While the invention has been particularly shown and described with reference to a preferred embodiment thereof and modifications thereto, it will be understood by those skilled in the art that various other changes in the form and details may be made therein without departing from the spirit and scope of the invention. For example, the apparatus shown in FIG. 4 could be modified to permit panchromatic scanning with laser light. Several holograms are recorded with the same wavelength and on top of each other using different recording geometries; with each hologram designed to reconstruct a near diffraction-limited spot in precisely the same location when illuminated by a laser beam of appropriate wavelength. The different colors reconstructing laser beams are coaxial. Rotation of the holographic cylinder results in scanning of the document with 2, 3 or 4 different wavelengths simultaneously.

Backscattered radiation is collected by the entire hologram aperture and deflected onto detectors. This could be accomplished with a first surface mirror with an aperture just large enough to pass the reconstructing laser beams. In applications where three primary color signals are needed (i.e., scanning full color documents for color copying), a reflective grating—possibly blazed—or a combination of dichroic mirrors can be used for spatial separation of the various colors. While the term "document" has been used in the description, it will be obvious that surfaces other than opaque document surfaces can be scanned by the disclosed embodiments.

What is claimed is:

1. An opaque document scanner comprising:
   (a) a least one hologram constructed from a first reference beam $\phi A$ and a object beam $\phi B$;
   (b) means for illuminating a portion of said hologram with a cone of coherent light corresponding to a fraction $\Delta \phi A$ of said reference beam $\phi A$ to reconstruct a scanning cone corresponding to a fraction $\Delta \phi B$ of said original object beam $\phi B$;
   (c) means positioning said hologram relative to a document to be scanned so that the focal point of said reconstructed beam $\Delta \phi B$ is positioned substantially in the plane of said document to cause a reflected pattern of radiation from the point on said document being illuminated by said beam $\Delta \phi B$;
   (d) a detector for providing electrical signals which vary corresponding to the amount of light energy focused on said detector; and
   (e) means including said hologram for imaging said pattern of reflected radiation onto said detector.

2. An apparatus for providing an electrical signal corresponding to a reflective dependent characteristic of a surface comprising:
   (a) a least one hologram constructed from a first reference beam $\phi A$ and an object beam $\phi B$;
   (b) means for illuminating a portion of said hologram with a cone of coherent light corresponding to a fraction $\Delta \phi A$ of said reference beam $\phi A$ to reconstruct a scanning cone corresponding to a fraction $\Delta \phi B$ of said original object beam $\phi B$;
   (c) said hologram being positioned substantially parallel to said surface and spaced therefrom so that the focal point of said scanning cone $\Delta \phi B$ illuminates a point on said surface and the axis of said scanning cone is substantially normal to said surface;
   (d) a detector for converting light energy imaged on said detector to corresponding electrical signals; and
   (e) means including said hologram for imaging the reflected light from said point on said surface to said detector.

3. In a device for imaging a light responsive detector with the pattern of light reflected from a point on a surface, which point is illuminated with a converging beam of light generated by illuminating a hologram with a fraction $\Delta \phi$ of a diverging beam of light, said beams corresponding to the original reference and object beams used to construct said hologram, the improvement comprising:
   holographic means positioned to receive the pattern of light reflected from said illuminated point to provide a converging beam corresponding to the original reference beam employed in constructing said holographic beam.

4. The combination recited in claim 1 further including means for mounting said hologram for movement relative to said cone of coherent light corresponding to said fraction $\Delta \phi A$.

5. The combination recited in claim 4 further including means for moving said mounting means about an axis of rotation which intersects the focal point of said cone of coherent light corresponding to said fraction $\Delta \phi A$ to cause a succession of reconstructed scanning cones to generate a scan line.

6. The combination recited in claim 5 in which said mounting means includes a cylindrical member.

7. The combination recited in claim 6 in which said cylindrical member is transparent and said at least one hologram is disposed on a circumferential segment of said cylindrical member.

8. The combination recited in claim 7 in which said cylindrical member includes a plurality of identical holograms disposed around the circumference of said member.

9. The combination recited in claim 7 in which said cylindrical member includes a plurality of different holograms, disposed around said circumference to cause a like plurality of scan lines to be generated.

10. A holographic laser scanner for providing an electrical signal representing reflective dependent characteristics of an opaque surface, said scanner comprising in combination:
    (a) transparent holographic means constructed from a reference beam $\phi A$ and an object beam $\phi B$;
    (b) means including a first portion of said holographic means for sequentially reconstructing a series of converging beams each of which corresponds to a fraction of said object beam $\phi B$ and each of which has a focal point which illuminates one point on a scanned line on said opaque surface;
    (c) a detector; and
    (d) means including another portion of said holographic means for imaging onto said detector a converging beam corresponding to said reference beam $\phi A$ and reconstructed from the pattern of light reflected from each said illuminated point.

11. The combination recited in claim 10 in which said means for sequentially reconstructing includes a diverging laser beam which corresponds to a fraction $\Delta \phi A$ of said reference beam $\phi A$.

12. The combination recited in claim 11 further comprising means for moving said holographic means through said diverging laser beam and conjointly moving said another portion.

13. The combination recited in claim 12 in which said transparent holographic means comprises first and second cylindrical members mounted for conjoint movement, each of which includes a like plurality of circumferentially disposed individual holograms; and
    means mounting said members to said moving means with the axis of rotation intersecting the focal points of said diverging laser beam which corresponds to said fraction $\Delta \phi A$.

14. The combination recited in claim 12 in which said transparent holographic means includes a flat plate on which a plurality of holograms are disposed.

15. The combination recited in claim 12 in which said transparent holographic means includes first and second flat plates mounted for conjoint movement about an axis normal to said surface to cause said hologram on said first disk to intersect said diverging laser beam, thereby reconstructing said series of converging beams.

16. The method of converting reflective dependent characteristics of an opaque surface to corresponding electrical signals comprising the following steps:
  (1) moving a hologram H constructed from a reference beam A and an object beam B transversely through a first coherent divergent beam $\Delta\phi A$ corresponding to a predetermined fraction of said reference beam A to illuminate a fractional strip of said hologram;
  (2) positioning said surface at the focal point of the reconstructed beam $\Delta\phi B$ to illuminate a line of points on said surface by beams $\Delta\phi B$ which are successively reconstructed as said hologram moves through said first beam, said surface being positioned substantially normal to the axis of each reconstructed beam $\Delta\phi B$ so that the pattern of reflected light from each point illuminates the entire hologram H;
  (3) reconstructing a second beam corresponding to said reference beam A moving from the pattern of light reflected from each said illuminated point; and
  (4) converting the light energy at the focal point of said second beam to an electrical signal.

* * * * *